United States Patent [19]

Iwanaga et al.

[11] Patent Number: 5,303,609
[45] Date of Patent: Apr. 19, 1994

[54] TOGGLE TYPE PARKING BRAKE LEVER APPARATUS

[75] Inventors: Yoshihisa Iwanaga; Yoshitaka Koketsu, both of Kariya, Japan

[73] Assignee: Kabushiki Kaisha Toyoda Jidoshokki Seisakusho, Kariya, Japan

[21] Appl. No.: 900,988

[22] Filed: Jun. 18, 1992

[30] Foreign Application Priority Data

Jun. 25, 1991 [JP] Japan .................................. 3-153202
Jun. 26, 1991 [JP] Japan .................................. 3-154749

[51] Int. Cl.5 ......................... B60T 7/10; G05G 5/06; F16C 1/12
[52] U.S. Cl. .................................... 74/523; 74/501.6; 74/527; 74/575
[58] Field of Search ...................... 74/501.6, 520, 523, 74/538, 527, 575, 577 S

[56] References Cited

U.S. PATENT DOCUMENTS 2,240,783  5/1941  Jandus .
2,464,096  3/1949  Orscheln .
3,379,074  4/1968  Hirst, Jr. .
4,127,042  11/1978  Lipshield ............................. 74/520
4,271,718  6/1981  Bopp et al. .
4,292,858  10/1981  Lipshield .
4,311,060  1/1982  Kawaguchi et al. .
5,065,643  11/1991  Axtell ................................. 74/501.6

FOREIGN PATENT DOCUMENTS

28447/71  11/1972  Australia .
925024  5/1963  United Kingdom .
1580005  11/1980  United Kingdom .
2147088  5/1985  United Kingdom ................... 74/523

Primary Examiner—Richard M. Lorence
Attorney, Agent, or Firm—Brooks Haidt Haffner & Delahunty

[57] ABSTRACT

A toggle type parking brake lever apparatus capable of surely holding a brake lever at a brake application position is provided. Attached to the brake lever is a pivotable stopper pawl, with which a stopper surface formed on a stopper plate is adapted to be engaged in a brake application condition so as to inhibit the brake lever from being turned in a brake releasing direction. A stopper releasing rod with a push button is provided longitudinally of the brake lever to pivot the stopper pawl, thereby to disengage the stopper pawl from the stopper face. The invention is also applicable to a brake lever which is supported to a lever bracket, tiltably back and forth, and left and right, by means of a universal joint.

3 Claims, 9 Drawing Sheets

TOGGLE TYPE PARKING BRAKE LEVER APPARATUS

BACKGROUND OF THE INVENTION

1. Field of the Invention

The present invention relates to a toggle type parking brake lever apparatus adapted to be used in industrial vehicles such as a forklift or the like.

2. Description of the Prior Art

FIG. 10 shows a typical conventional toggle type parking brake lever apparatus in which a brake lever 1 is journalled to a lever bracket 3 secured to a machine frame 2 at the front part of a cabin. This lever bracket 3 is formed therein with an elongated hole 4 which extends toward the pivot point of the brake lever 1, and along which a hook 5 is movably held. The hook 5 is connected with the forward ends of brake wires 6 which are in turn connected to a brake main body (not shown). A link 7 is connected between the intermediate section of the brake lever 1 and the hook 5 so as to constitute the so-called toggle mechanism in cooperation with the brake lever 1. Accordingly, when the brake lever 1 is manually turned from a brake release position (which is a forward tilted position as indicated by the dotted chain line) to a brake application position, an upright position indicated by the solid line, which slightly exceeds the dead center point D. P. of the toggle mechanism, the hook 5 is pulled toward the brake lever 1, causing the brake wires 6 to be towed and therefore applying the parking brake.

The above-mentioned parking brake apparatus provides an advantage such that a stable braking force can be ensured by manually turning the brake lever 1 to the brake application position. However, the holding of the lever in this apparatus can only rely upon a turning moment which is applied to the brake lever 1 by the reaction to the towing force of the brake wires 6 which is effected when overriding the dead center point. Accordingly, if an external force is exerted on the brake lever 1, being caused by an unexpected accident such as an erroneous manipulation by the driver or the like, so that the brake lever 1 is moved in the brake releasing direction, reversely overriding the dead center point, the brake lever 1 is automatically and continuously turned to the brake release position by the above-mentioned reaction to the towing force, resulting in release of the parking brake.

SUMMARY OF THE INVENTION

Accordingly, the present invention is devised in order to prevent occurrence of the above-mentioned unexpected accident, and it is one main object of the present invention to provide a toggle type parking brake lever apparatus which can surely hold a brake lever at a brake application position.

To the end, according to one aspect of the present invention, there is provided a toggle type parking brake lever apparatus comprising a lever bracket fixed in a cabin, a brake lever having a lower end part rotatably supported by the lever bracket, a hook movably attached to the lever bracket and connected to the front end of a brake wire(s), and a link having an upper end part journalled by a coupling pin to the brake lever and a lower end part journalled to the hook. A stopper pawl is pivotally attached to the brake lever. The lever bracket is provided with a stopper plate having a stopper face which is adapted to be engaged with the forward end part of the stopper pawl so as to inhibit the brake lever from being turned in a brake releasing direction, and a stopper releasing rod with a push button is provided along the longitudinal direction of the brake lever in order to tilt the stopper pawl to release the same from the stopper face.

When the brake lever is located at the brake application position, the stopper pawl engages with the stopper face of the stopper plate, and accordingly the brake lever can not be turned in the brake releasing direction. In order to release the brake, two steps are inevitably required, that is, the push button on the stopper releasing rod is depressed, and thereafter the brake lever is turned forward. Accordingly, even if an external force is exerted on the brake lever by for example a careless manipulation by the driver, the brake lever is inhibited from being turned in the brake releasing direction, thereby it becomes possible to enhance the safety of the parking brake.

Further, the stopper releasing rod is preferably provided within the brake lever with the aim of enhancing the compactness of the brake lever.

In order to achieve the above-mentioned object, according to another aspect of the present invention, there is provided a toggle type parking brake comprising a lever bracket secured in a cabin, a brake lever having a lower end part which is supported by the lever bracket in a manner allowing the same to tilt back and forth and right and left, through the intermediary of a universal joint, a hook movably attached to the lever bracket and connected with the forward end of a brake wire, a link having an upper end journalled to the intermediate part of the brake lever and a lower end part journalled to the hook, spring means provided on the lever bracket for normally uniformly holding the brake lever at a lateral position, and a stopper projecting from the lever bracket into the normal path of the brake lever for inhibiting the brake lever from being turned forward from a brake application position to a brake release position.

In the above-mentioned parking brake lever apparatus, when the brake lever is located at the brake application position, the brake lever is inhibited from being turned to the brake release position from the brake application position due to the provision of the stopper. Further, although the spring means normally prevents the brake lever from being laterally turned, the brake lever can be retracted from the stopper by turning the brake lever in the leftward or rightward direction, overcoming the resilient force of the spring means. As a result, the brake lever can be turned to the brake release position.

Due to the provision of the stopper, two steps are required in order to release the brake, that is, the brake is laterally tilted so as to release the lock by the stopper, and thereafter it is turned forward. Accordingly, even if an external force is exerted on the brake lever by for example a careless manipulation of the driver, the brake lever can be inhibited from being turned toward the brake release position, effectively enhancing the safety of the parking brake.

DESCRIPTION OF THE PREFERRED EMBODIMENTS

Figure 1:
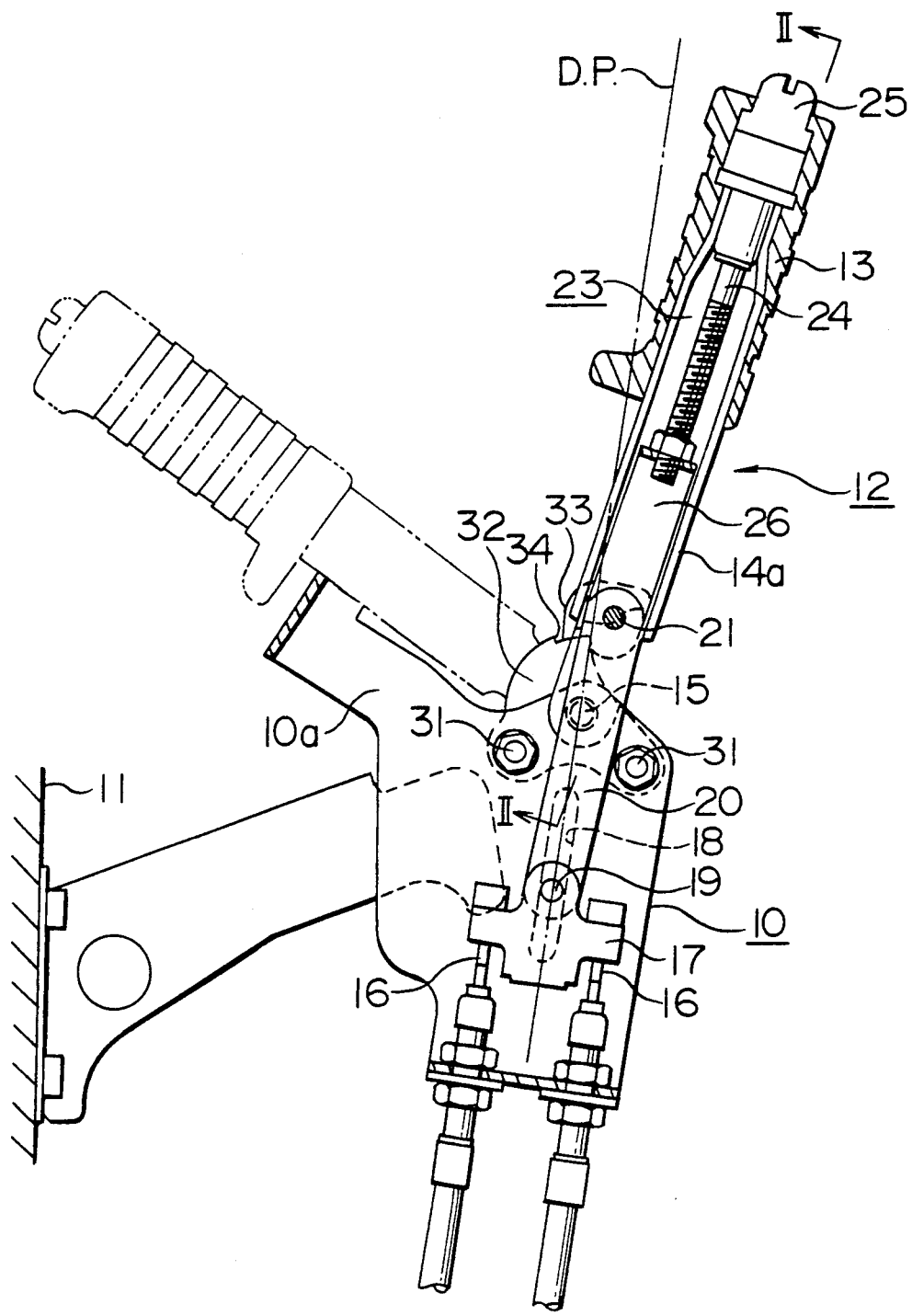
FIG. 1 is a longitudinal sectional view illustrating a first embodiment of a toggle type parking brake lever apparatus according to the present invention.

Preferred embodiments of a toggle type parking brake lever apparatus according to the present invention will be described in detail with reference to the drawings in which the same reference numerals are used to indicate identical or corresponding parts.

Figure 2:
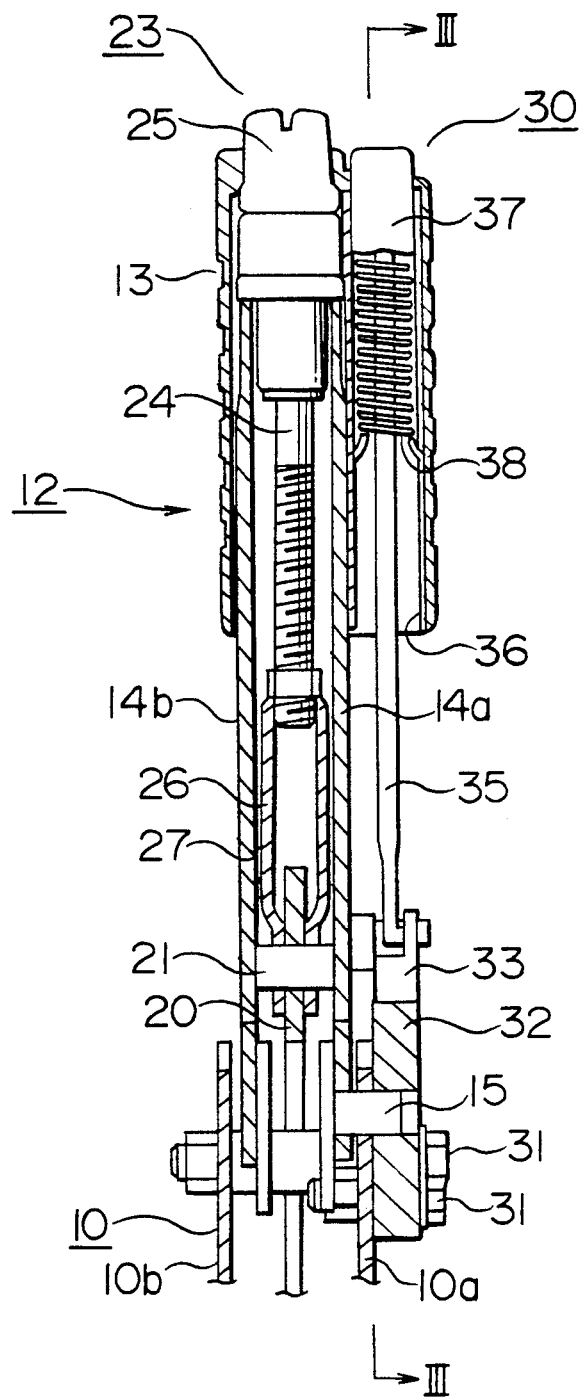
FIG. 2 is a sectional view generally along line II—II of FIG. 1.
Figure 3:
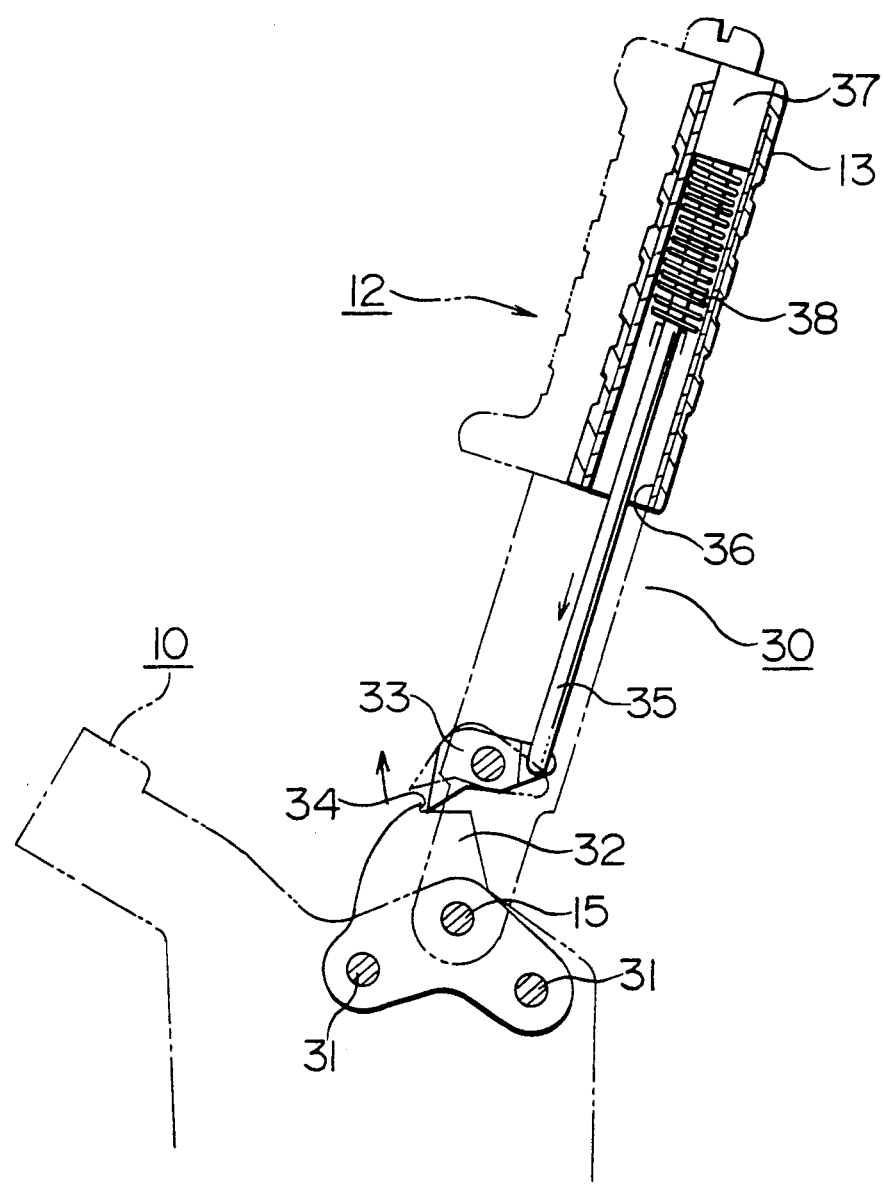
FIG. 3 is a sectional view along line III—III of FIG. 2.

Referring to FIGS. 1 and 2, there are shown a U-shaped lever bracket 10 secured to a machine frame 11 at the front end section of a not shown cabin, and a brake lever 12 for brake operation composed of a grip 13 fitted onto the upper part thereof, and two left and right plates 14a, 14b extending downward from the lower end of the grip 13. The lower end parts of the plates 14a, 14b are supported on the upper portion of the lever bracket 10 by means of a pivot pin 15 so as to be tiltable.

A hook 17 is connected with the front ends of brake wires 16 and arranged in the lower part of the lever bracket 10 so that it can be moved by means of a horizontal guide pin 19 along an elongated hole 18 formed in the lever bracket 10. It is noted that the center of the pivot pin 15 for the brake lever 12 is set on the extension line of the longitudinal center axis of the elongated hole 18. Further, a link 20 is disposed between the plates 14a and 14b of the brake lever 12 with its upper end part being pivotally attached on a horizontal coupling pin 21 which is supported by the intermediate parts of the plates 14a, 14b and with its lower end part being rotatably attached to the guide pin 19 for the hook 17.

With this arrangement, when the brake lever 12 is turned from a brake release position (forward tilted position) indicated by the dotted chain line in FIG. 1 to a brake application position (upright position indicated by the solid line in FIG. 1) which slightly exceeds the dead center point D. P. on the extension line of the above-mentioned elongated hole 18, the link 20 pulls up the brake wires 16 through the hook 17, thereby to apply the parking brake in a manner similar to that in the conventional arrangement.

Furthermore, there is provided a brake release preventing mechanism 30 for inhibiting the brake lever when held in the brake application position from being turned even if the brake lever 12 is merely turned forward. This brake release preventing mechanism 30 includes a stopper plate 32 fixedly secured by bolts 31 to the outer surface of the upper part of one 10a of vertical sections of the lever bracket 10, and a stopper pawl 33 pivotally journalled at one end thereof to the plate 14a of the brake lever 12 on the same side as the vertical wall section 10a. The upper edge part of the stopper plate 32 is formed into an arcuate shape and provided at a suitable location thereon with a stopper face 34 facing in the brake application direction. Further, a stopper releasing rod 35 is journalled at its lower end to the other end of the stopper pawl 33. The stopper releasing rod 35 extends substantially in parallel with the brake lever 12 and has its top end inserted into a pipe 36 attached to the grip 13 on the brake lever 12. A push button 37 is mounted in the top end of the stopper releasing rod 37 so as to project from the top end of the grip 13. A compression spring 38 is disposed in the pipe 36 around the stopper releasing rod 35 so as to normally urge the push button 37 upward.

Due to the action of the compression spring 38, the stopper releasing rod 35 is lifted up so as to cause the front end of the stopper pawl 33 to abut always against the upper edge part of the stopper plate 32. Accordingly, even if the brake lever 12 is turned forward to intend returning the brake lever 12 to the brake release position from the brake application position, the front end of the stopper pawl 33 abuts against the rearward facing stopper face 34 on the stopper plate 32, and accordingly the brake lever cannot be turned any more. In order to aim at preventing the parking brake under this action from being released due to an erroneous manipulation upon the brake lever 12, it is required that the front end part of the stopper pawl makes contact with the stopper face 34 when the brake lever 12 is located at or in the vicinity of the dead center position D. P.

With this arrangement, in order to release the parking brake, it is required that the push button 37 is at first depressed, and then the brake lever 12 is turned forward. That is, when the push button 37 is depressed overcoming the resilient force of the compression spring 38, the stopper releasing rod 35 is pushed downward so as to pivot the stopper pawl 33, and accordingly the front end part of the stopper pawl 33 is raised up to a height at which the front end part does not make contact with the stopper face 34 on the stopper plate 32. Thus, the stopper pawl 33 does not interfere with the stopper plate 32, and accordingly the brake lever 12 can be turned direct to the brake release position.

Further, when the brake lever 12 is turned rearward from the brake release position to the brake application position, the front end part of the stopper pawl 33 slides on the upper edge part of the stopper plate 32, but the stopper face 34 facing rearward does not hinder the turning of the brake lever 12.

Referring to FIGS. 1 and 2, there is shown a brake operation force adjusting mechanism, generally denoted by reference numeral 23, which is adapted to absorb a possible play in the brake operation system caused by an elongation of the brake wires 16 or the like, so as to adjust the brake operation force. In this adjusting mechanism 23, an adjusting rod 24 is rotated by a knob 25 thereon causing a slider 26 to slide along guide grooves 27 formed on the side surfaces of the plates 14a, 14b of the brake lever 24 so that the coupling pin 21 for the link 20 is moved toward the front end of the brake lever 12, thereby to adjust the position of the hook 17 in order to absorb the play produced in the brake operation system.

Figure 4:
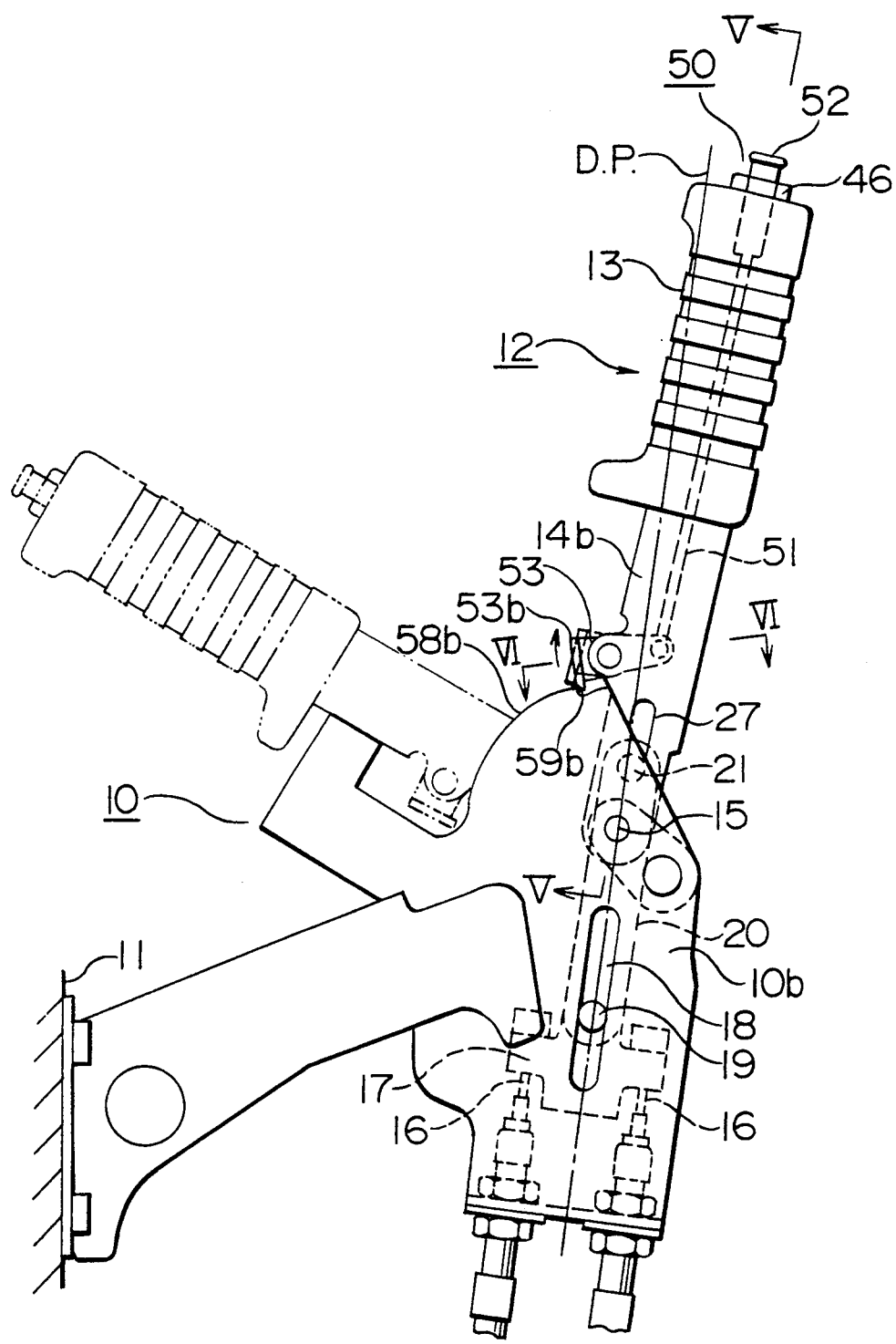
FIG. 4 is a longitudinal sectional view illustrating a second embodiment of the toggle type parking brake lever apparatus according to the present invention.
Figure 5:
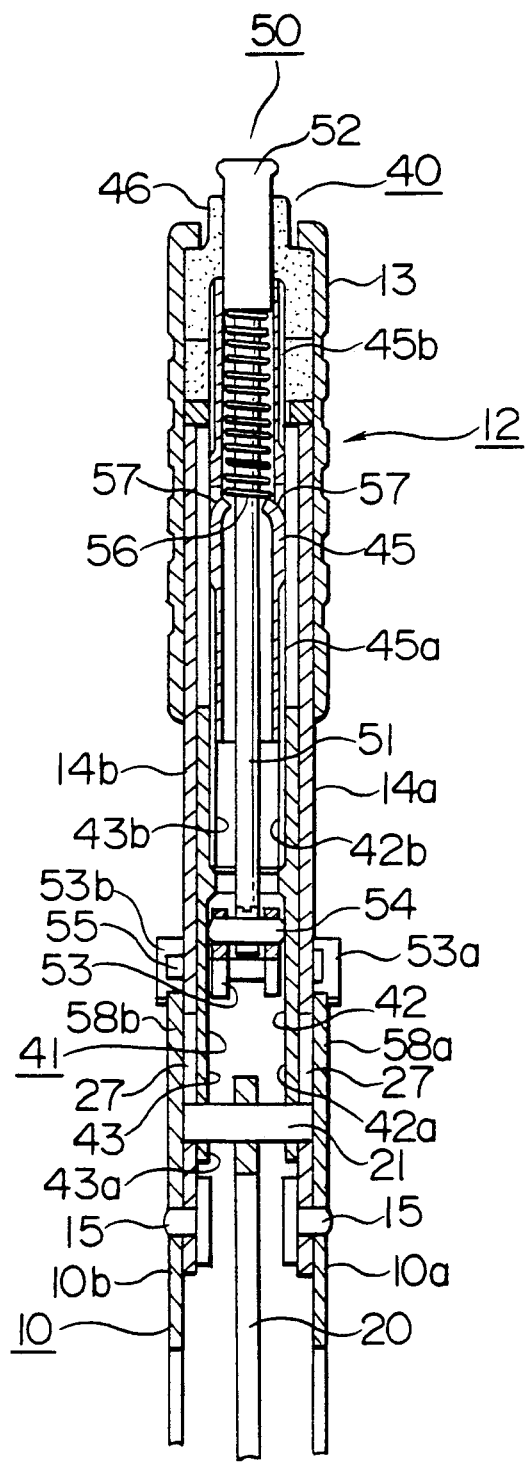
FIG. 5 is a sectional view along line V—V of FIG. 4.
Figure 6:
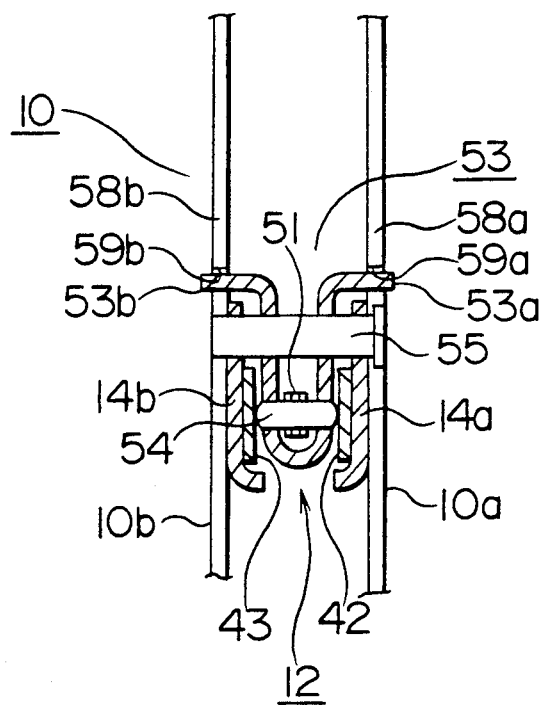
FIG. 6 is a sectional view along line IV—IV of FIG. 4.

FIGS. 4 to 6 show a second embodiment of the present invention which is characterized in that main components of both brake release preventing mechanism and brake operation force adjusting mechanism are disposed within the brake lever 12. In this second embodiment, the same reference numerals are used to denote parts identical with those shown in the previously explained first embodiment, and accordingly the detailed explanation thereof can be abbreviated.

As shown, the left and right plates 14a, 14b of the brake lever 12 are formed with a predetermined length of respective guide grooves 27, which longitudinally extend therealong and receive therein a horizontally extending coupling pin 21 in a manner allowing the pin 21 to move along the grooves 27. The upper end of the link 20 extending from the hook 17 for the brake wires 16 is journalled to this coupling pin 21. Further, a slider 41 forming a part of the brake operation force adjusting mechanism 20 is disposed in the brake lever 12. The slider 41 is composed of two slider plates 42, 43 which are disposed respectively along the inner surfaces of the plates 14a, 14b of the brake lever 12, and which hold at their lower end parts the end portions of the coupling pin 21, respectively. Each of the slide plates 42, 43 is composed of a planer lower part 42a, 43a and an upper part 42b, 43b having an arcuate shape in horizontal section. One of the upper end parts 42b and 43b is cooperated with another to form a substantially cylindrical body. The cylinder is formed on its inner surface with a thread part, with which a male thread part 45a on the lower part of a cylindrical thread member 45 disposed in the grip 13 fitted on the top part of the brake lever 12 is threadedly engaged. Further, a cylindrical adjusting knob 46 is disposed in the upper part of the grip 13 and threadedly engaged with a male part 45a formed on the upper part of the threaded member 45 so that the threaded member 45 is integrally incorporated with the knob 46. The upper end part of the adjusting knob 46 is projected upward through an opening formed in the upper end of the grip 13.

Furthermore, a stopper releasing rod 51 forming a part of the brake release preventing mechanism 50 is disposed within the threaded member 45 having the adjusting knob 46 and extends between the slider plates 42, 43 longitudinally of the brake lever 12. A push button 52 projected from the top end of the cylindrical adjusting knob 46 is threadedly engaged with the upper end part of the stopper releasing rod 51, and the rear end part of a stopper pawl 53 is coupled to the lower end part thereof by means of a pin 54. In this second embodiment, the stopper pawl 53 is formed of a U-shaped plate having both end parts 53a, 53b which are bent in opposite directions as clearly shown in FIG. 6. The pawl 53 is disposed between the slider plates 42, 43 with the bent end parts 53a, 53b being projected forward from the brake lever 12. The stopper pawl 33 is rotatably supported between the plates 14a, 14b of the brake lever 12 by means of a pin 55. A compression spring 56 is fitted onto the stopper releasing rod 51 and held in a compressed condition between protrusions 57 formed on the threaded member 45 and the push button 52 provided on the stopper releasing rod 51. Accordingly, the push button 52 is urged always upward so as to lift up the stopper releasing rod 51 in order to allow the lower edges of the front bent end parts 53a, 53b of the stopper pawl 53 to come into contact with the upper edge parts of stopper plates 58a, 58b. In this embodiment, the stopper plates 58a, 58b are formed as upward extensions of both vertical wall sections 10a, 10b of the lever bracket 10, and are formed at suitable positions on their upper edge parts with rearward facing stopper faces 59a, 59b, similar to the first embodiment, which are adapted to be engaged with the front bent end parts 54a, 54b of the stopper pawl 53 so as to prevent the brake lever 12 from being turned forward at a position in the vicinity of the dead center position D. P.

With this arrangement, the stopper pawl 53 is always brought into contact with the upper edge parts of the stopper plates 58a, 58b under the action of the compression spring 56, and accordingly the parking brake cannot be released after the brake lever 12 is pulled up to the brake application position unless the push button 52 is depressed so as to separate the stopper pawl 53 from the stopper plates 58a, 58b.

Also, when it is desired to adjust the brake operation force so as to absorb a play in the brake operation system which is caused by an elongation of the brake wires 16, abrasion between coupling parts of the components or the like, the brake lever 12 is first located at the brake release position, and then knob 46 is turned so as to rotate the threaded member 45 secured to the knob 46. As a result, the slider 41 threadedly engaged with the thread part 45a on the lower part of the thread member 45 slides upward toward the top end part of the brake lever 12 within the latter, and accordingly the coupling pin 21 slides along the guide grooves 27. Thus, the hook 17 and the brake wires 16 are lifted up together with the link 20, absorbing the play produced in the brake operating system.

In the above-mentioned second embodiment, both of the stopper releasing rod 51 of the brake release preventing mechanism 50 and the brake operation force adjusting mechanism 40 are disposed within the brake lever 12 with the aim of enhancing the compactness of the brake lever 12. However, the brake operation adjusting mechanism can be disposed in a part other than the brake lever 12 while the stopper releasing rod 51 alone is disposed in the brake lever 12. In this case, it is possible to make the brake lever 12 more light in weight.

Next, explanation will be made of a third embodiment of the present invention. In this embodiment, the structure of the toggle type parking brake lever apparatus is comparatively different from those explained in the first and second embodiments, but it is similar thereto in view of surely holding the brake lever at the brake actuating position in order to prevent occurrence of unexpected brake release.

Figure 7:
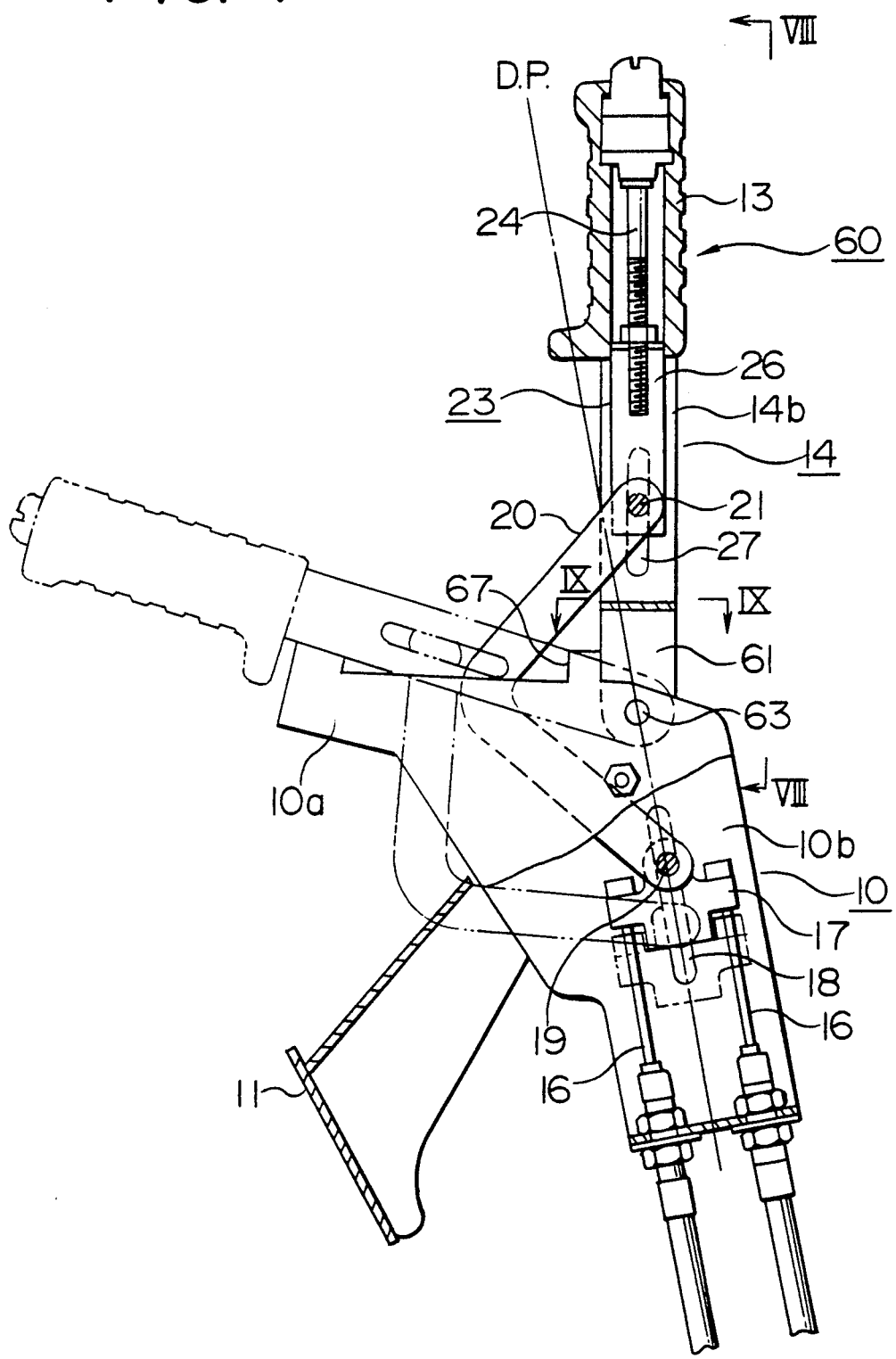
FIG. 7 is a longitudinal sectional view illustrating a third embodiment of the toggle type parking brake lever apparatus according to the present invention.
Figure 8:
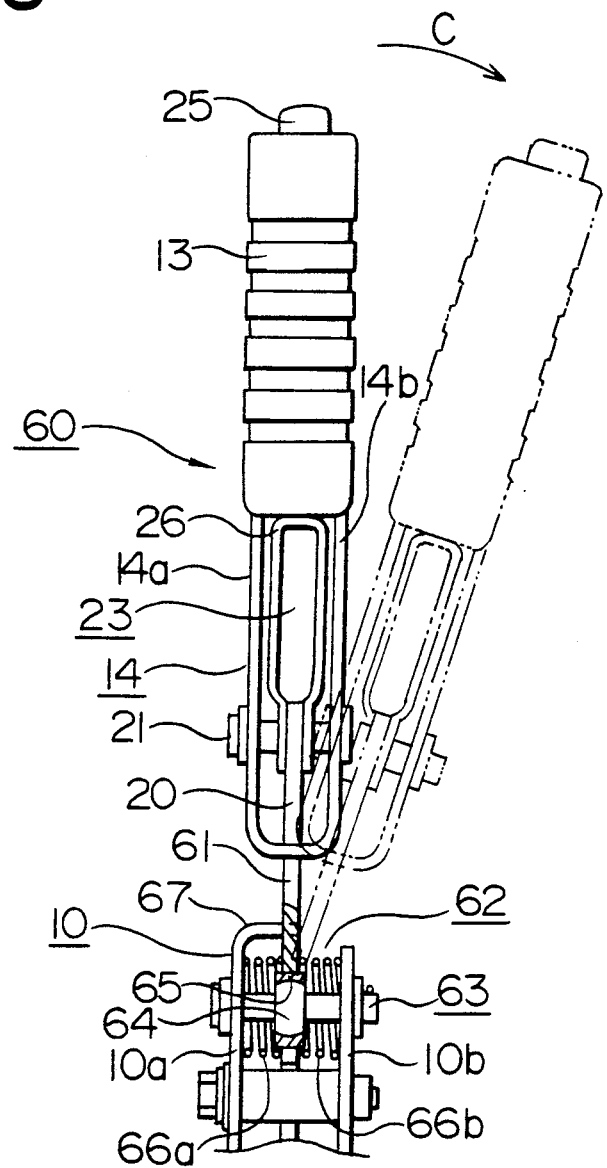
FIG. 8 is a view as viewed along line VIII—VIII of FIG. 7.

Referring to FIGS. 7 and 8, a brake lever 60 for brake operation includes a base plate 61 which extends from the lower end part of a U-shaped plate 14. The base plate 61 is supported tiltably back and forth, and right and left, by the lever bracket 10 at a location in the vicinity of the top thereof through a universal joint 62, which is a spherical joint in this embodiment as shown. The joint 62 comprises a pivot pin 63 horizontally attached between the paired vertical wall sections 10a, 10b of the lever bracket 10, an inner cylinder 64 having a spherical outer surface and mounted on the middle part of the pivot pin 63, and an outer cylinder 65 mounted to the lower end part of the base plate 61 and slidably fitted onto the inner cylinder 64. Further, compression springs 66a, 66b are disposed on both sides of the base plate 61 of the brake lever 60 to normally hold the base plate 61 in a vertical condition (which is a condition indicated by the solid line in FIG. 8).

Even in the third embodiment, when the brake lever 60 is turned from a brake release position (forward tilted position) indicated by the dotted chain line in FIG. 7 to a brake application position (upright position indicated by the solid line in FIG. 7) which slightly exceeds the dead center point D. P. on the extension line of the elongated hole 18, the link 20 lifts up the brake wires 16 through the hook 17 so as to apply the parking brake as is in the econventional arrangement.

Figure 9:
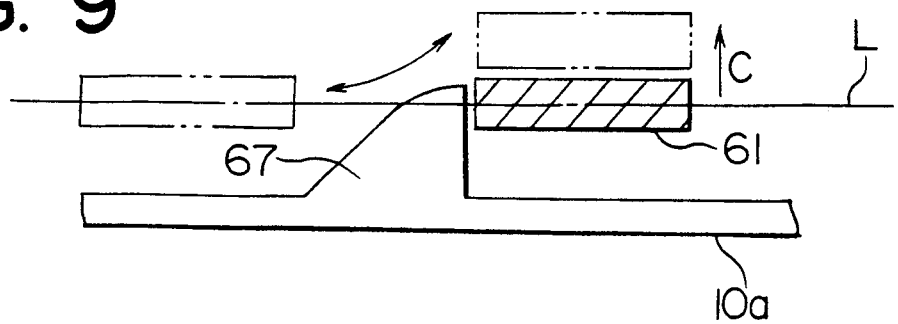
FIG. 9 is a schematic sectional view along line IX—IX of FIG. 7.
Figure 10:
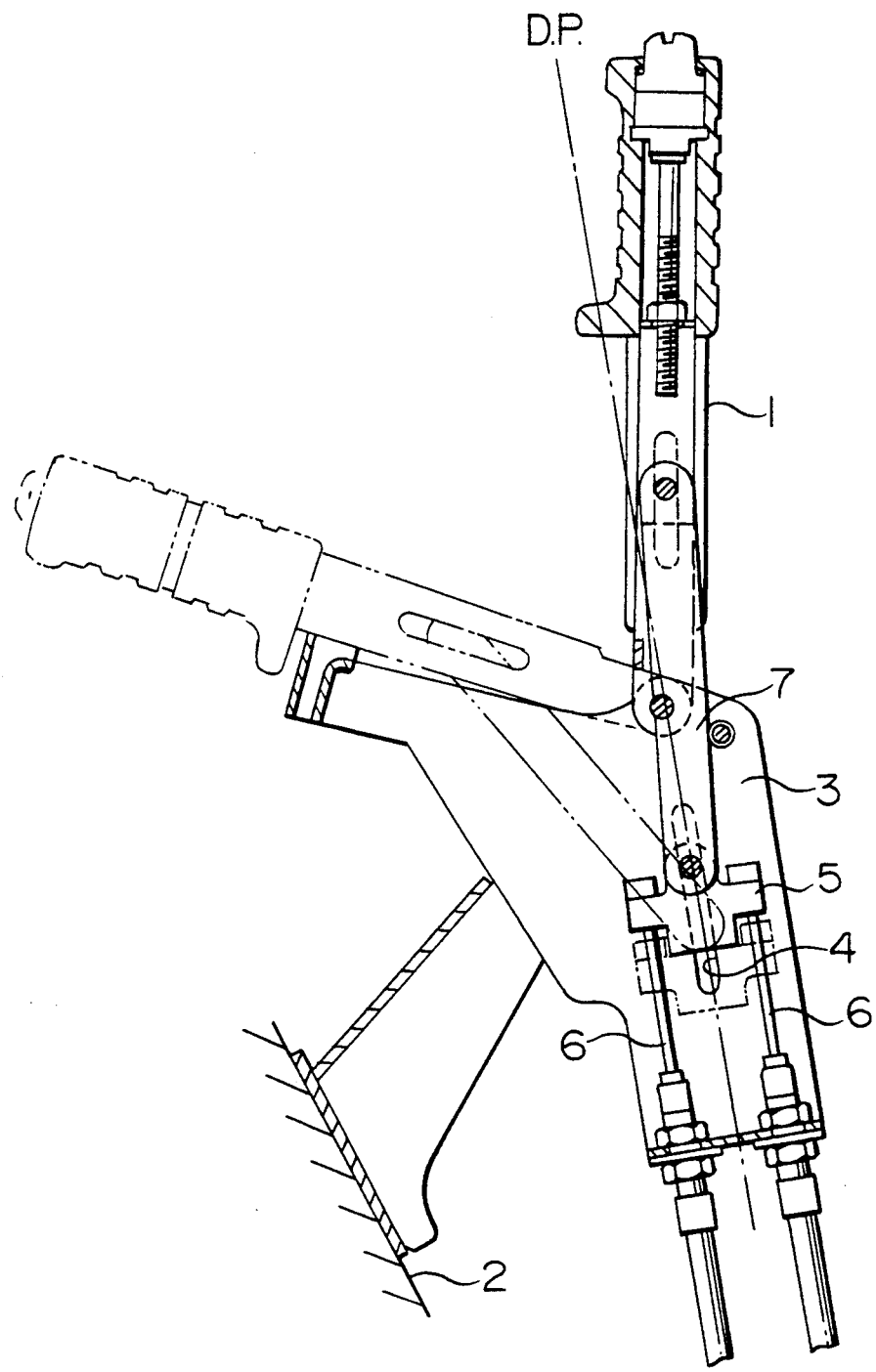
FIG. 10 is a longitudinal sectional view illustrating a conventional toggle type parking brake lever apparatus.

In the third embodiment, a stopper 67 is formed at the upper edge part of the vertical wall section 10a of the lever bracket 10 in order to inhibit the brake lever 60, which has been positioned at the brake application position, from being turned even if it is intended being merely turned. The stopper 67, formed in a saw tooth shape as shown in FIG. 9, has its apex projecting up to a position which exceeds a normal turning passway L for the brake lever 60. The leading edge part of the stopper 67 is inclined so that its width projected from the vertical wall section 10a of the lever bracket 10 gradually increases. Further, the trailing edge part of the stopper 67 is perpendicular to the turning path L for the brake lever 60.

With the provision of the stopper 67, when the brake lever 60 is turned rearward from the brake release position to the brake application position, the base plate 61 is first brought into contact with the leading edge part of the stopper 67, and when the brake lever 60 is further turned rearward, it is pressed in the direction of the arrow C shown in FIGS. 8 and 9 along the leading edge part of the stopper 67. Since the brake lever 60 is supported by the universal joint 62, the brake lever 60 is tilted in the direction of the arrow C overcoming the resilient forces of the compression springs 66a, 66b due to the above pressing force. When the brake lever 60 overrides the apex of the stopper 67, it automatically returns onto the normal path L under the action of the compression springs 66a, 66b and is then held in the brake application position by the reaction to the towing force of the brake wires 16. In this brake application position, the front edge part of the base plate 61 of the brake lever 60 makes contact with the trailing edge part of the stopper 67, and the brake lever 60 cannot be moved even if it is pressed merely toward the brake releasing position.

When it is desired to release the parking brake, the brake lever 60 is tilted in the direction of the arrow C up to a position where the base plate 61 does not interfere with the stopper 67, overcoming the compression springs 66a, 66b, and then the brake lever 60 is turned forward. At the time when the base plate 61 overrides the apex of the stopper 67, if the force in the direction of the arrow C is released, the brake lever 60 is automatically returned to the normal passway L under the action of the compression springs 66a, 66b and subsequently the brake lever 60 can be turned to the brake release position as in the conventional arrangement.

In this embodiment, the link 20 has a dogleg shape as shown in FIG. 7 in order to prevent the same from interfering with the stopper 67. However, it is noted that the link 20 may have another suitable shape. Further, the brake lever 60 in the third embodiment has a brake operation force adjusting mechanism similar to those explained in conjunction with the first and second embodiments.

What is claimed is:

1. A toggle type parking brake lever apparatus comprising a lever bracket mounted on a vehicle, a brake lever having a first end part rotatably supported on said lever bracket, a hook movably coupled to said lever bracket and connected with a brake wire member, an over-center toggle mechanism including a link having a first end part journalled to said brake lever by a coupling pin and an opposite end part journalled to said hook, a stopper pawl pivotally attached to said brake lever, a stopper plate provided on said lever bracket and having an arcuate upper edge part on which is formed a single stopper face facing in the brake application direction adapted to be engaged, when said brake lever reaches a predetermined position between a brake application position and a dead center point of said toggle mechanism upon moving from the brake application position toward the dead center point, which a leading end part of said stopper pawl so as to inhibit said brake lever from being turned in a brake releasing direction past said predetermined position, and a stopper releasing rod having a push button at one end and disposed longitudinally of said brake lever, said rod being coupled thereto for pivoting said stopper pawl so as to disengage said stopper pawl from said stopper face, said brake lever having a second end part provided with a grip, and said stopper releasing rod is led through a pipe parallel to said brake lever, said push button projecting from an end of said grip, and a compression spring is disposed in said pipe, surrounding said stopper releasing rod and normally urging said push button so as to cause said stopper pawl to abut against said upper edge part of said stopper plate.

2. A brake lever apparatus as set forth in claim 1, further comprising a brake operation force adjusting mechanism for positionally adjusting said hook so as to absorb play in said brake lever apparatus.

3. A brake lever apparatus as set forth in claim 2, wherein said brake, and operation force adjusting mechanism is disposed in said grip.

* * * * *

UNITED STATES PATENT AND TRADEMARK OFFICE
CERTIFICATE OF CORRECTION

PATENT NO. : 5,303,609
DATED : April 19, 1994
INVENTOR(S) : Y. Iwanaga et al

It is certified that error appears in the above-indentified patent and that said Letters Patent is hereby corrected as shown below:

Column 8, line 29, change "which" to --with--; line 50 after "brake" delete ", and".

Signed and Sealed this

Sixth Day of September, 1994

Attest:

BRUCE LEHMAN

Attesting Officer

Commissioner of Patents and Trademarks